Patented May 12, 1953

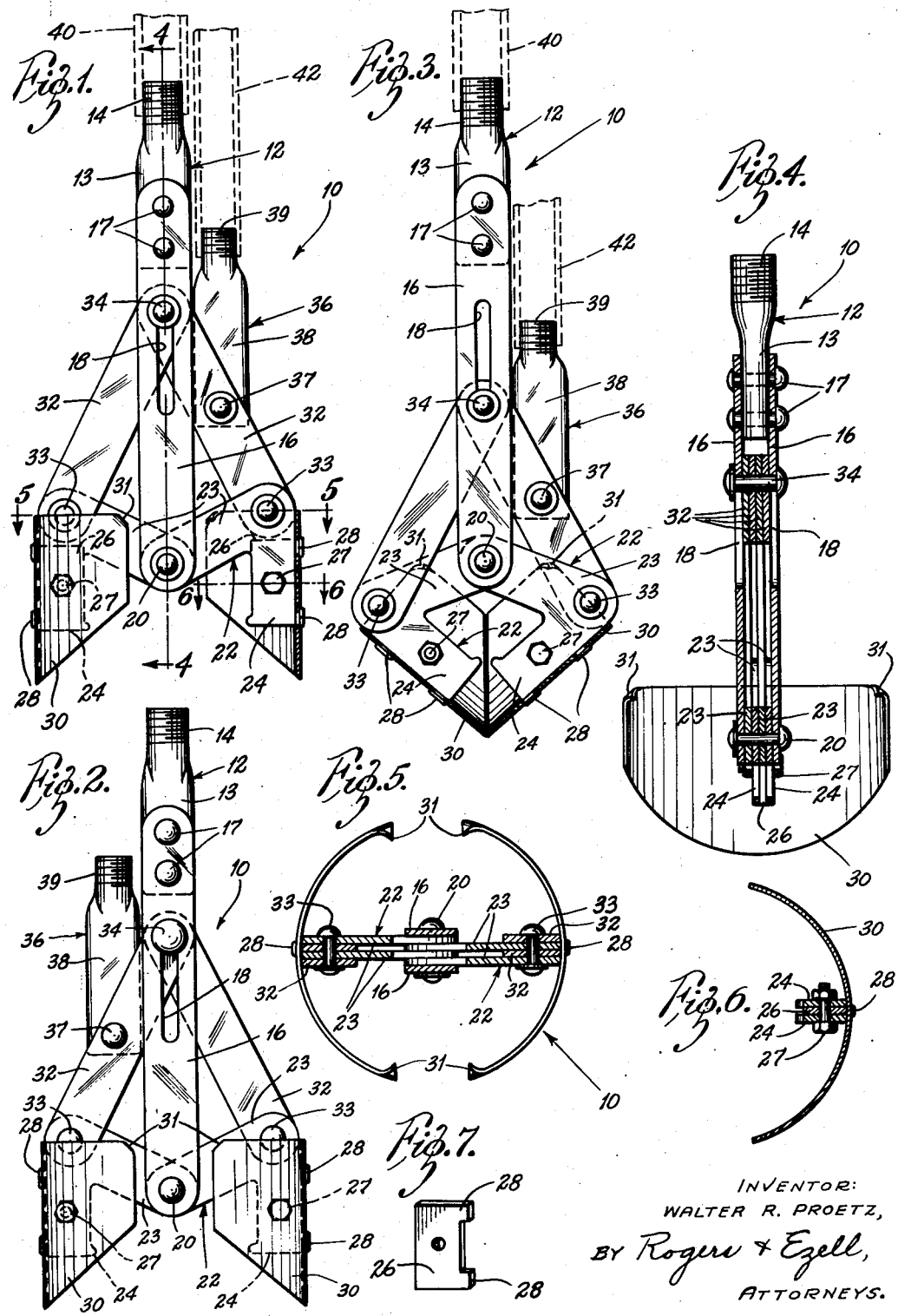

2,638,372

UNITED STATES PATENT OFFICE 2,638,372

DIGGING TOOL

Walter R. Proetz, St. Louis, Mo.

Application September 29, 1947, Serial No. 776,729

4 Claims. (Cl. 294—50.8)

The present invention relates generally to grappling or earth digging tools, and more particularly to a grappling or earth working tool constructed for operation and use in a well, pipe, or hole of a minimum diameter substantially equivalent to the greatest lateral over-all dimension of the tool with its blades in open position.

Heretofore, many types and forms of grappling tools and posthole diggers have been constructed, but no blade-tool adapted for grappling or earth digging has been developed which may be employed to achieve its several functions in a deep working hole having lateral clearance only slightly greater than the greatest lateral over-all dimension of the tool with its blades in open position. Posthole diggers generally employ a scissors type action for engaging within the blades dirt which is to be removed, which limits to a foot or so the depth to which a hole of such minimum diameter can be formed.

Therefore, it is an object of the present invention to provide a novel tool adapted for grappling and posthole digging which can be inserted and operated in a pipe, well, posthole, or the like, having a depth substantially equivalent to the length of the whole working tool and having a diameter only slightly greater than the maximum lateral over-all dimension of the tool with its blades in open position.

Another object is to provide a novel grappling and earth digging tool which is operated to move the blades by a member reciprocable longitudinally of the holding handle and which is disposed within a zone defined by a projection of the blades when in open position.

Another object is to provide a novel grappling and earth digging tool which is composed of a plurality of links supporting a pair of blades for opening and closing actions.

Other objects are to provide a novel grappling and earth digging tool which is inexpensive, which is rugged in construction and is adapted to fulfill its intended functions for a long period of time without repair, which is operated in a simple and easy manner, which is efficient in performing its intended functions, and which is of a size and weight to render it readily usable without the exertion of great strength or skill.

The foregoing and other objects and advantages are apparent from the following description taken with the accompanying drawing, in which:

Fig. 1 is a side elevational view of a grappling and earth digging tool formed in accordance with the teachings of the present invention, the blades being shown in open position and the detachable holding and operating handles being shown in broken lines and broken away for conservation of space, one of the blades being shown in vertical cross section;

Fig. 2 is a side elevational view of the tool of Fig. 1 looking at the other side thereof;

Fig. 3 is a side elevational view similar to Fig. 1 but with the blades in closed position, both blades being shown in vertical cross section;

Fig. 4 is a transverse vertical cross-sectional view on the line 4—4 of Fig. 1;

Fig. 5 is a horizontal cross-sectional view on the line 5—5 of Fig. 1;

Fig. 6 is a horizontal cross-sectional view on the line 6—6 of Fig. 1; and

Fig. 7 is an isometric view of an attaching lug.

Referring to the drawing more particularly by reference numerals, 10 indicates generally a grappling and earth digging tool constructed in accordance with the concepts of the present invention. The tool 10 includes a base member 12 preferably formed of a segment of pipe and including a flattened portion 13 and a threaded portion 14. A depending link 16 is secured to each side of the flattened portion 13 by suitable rivets 17, or the like, the links 16 being disposed in aligned opposed relation. Each link 16 includes a longitudinal slot 18.

Pivotally mounted on a rivet 20 supported by the depending links 16 adjacent the lower ends thereof are two pairs of spaced V-links 22, each link 22 including legs 23 and 24. The legs 24 of each pair of V-links 22 are disposed on opposite sides of a lug 26, being secured thereto by a suitable nut and bolt assembly 27. Each lug 26 includes spaced projections 28 which extend through spaced apertures in an arcuate blade 30, said projections 28 being peened over to securely maintain the blade 30 in position against the lug 26 and the outer edges of the legs 24, as is clear from the drawing. Each blade 30 has inwardly bent upper corners 31 which prevent snagging of the blades 30 on withdrawals. A pair of connecting links 32 is connected to each pair of V-links 22 at the juncture of the legs 23 and 24 by a suitable rivet 33. The other end of each of the four connecting links 32 is pivotally mounted on a suitable rivet 34 which is disposed in the slots 18 of the depending links 16 for movement therein longitudinally of said depending links 16.

An operating member 36 is pivotally connected to one pair of connecting links 32 by a suitable rivet 37, the operating member 36 being shown as a segment of pipe comprising a flattened portion 38 and a threaded portion 39.

A holding handle 40 is connected to the threaded portion 14 of the base member 12 and an operating handle 42 is connected to the threaded portion 39 of the operating member 36. For use of the tool 10, the handles 40 and 42 may comprise lengths of pipes of desired lengths or other extension members.

Operation

The tool 10 is designed to have the blades 30 moved from the position of Fig. 1 to the position of Fig. 3 by reciprocative manipulation of the operating member 36 actuated by a suitable handle 42. The operating member 36 maintains a position substantially parallel with the base member 12 at all times. The operating member 36 will move away from the depending links 16 a small amount as the legs 23 of the V-links 22 reach horizontal positions, but at all times remains within a zone defined by a projection of the blades 30 when in open position.

Hence, the tool 10 may be employed to clean out pipes, and the like, access to which is had only through deep openings or connecting pipes of small diameters. It is contemplated that the present tool 10 will be constructed in several blade sizes, and it is clear that a tool 10 of a particular blade size can be used to a depth equal to the holding handle 40 in a deep pipe, well, or an opening of a diameter only slightly greater than the maximum lateral over-all dimension of the blades 30 when in open position. As illustrated, the maximum working space required for the tool 10 is determined when the legs 23 of the V-links 22 are in horizontal position, but this measurement is only slightly greater than the maximum lateral measurement when the blades 30 are in the open position. The tool 10, of course, can be constructed with right angular links replacing the V-links 22, although the latter is preferable in order to decrease the lateral displacement movement of the operating member 36 in moving between upper and lower positions.

The present tool 10 functions as a posthole digger in the same manner as in grappling. Hence, a hole may be formed in the ground by the present tool 10 to the depth of the holding handle 40 and to a constant minimum diameter only slightly greater than the maximum lateral over-all dimension of the blades 30 when in open position. Furthermore, the present tool 10 functions as a posthole digger with greater ease than the scissors type digger, since both hands can be employed to surround both handles 40 and 42. It is not necessary to strain the arms in wide-apart positions as is true when employing a typical posthole digger. Greater accuracy is attained in the digging action, since both hands can be employed in grasping the handle 40 and, incidentally, holding the handle 42; whereas, with a standard digger, the two hands may grasp separate handles leading to the blades.

It is apparent that there has been provided a tool which fulfills the objects and advantages sought therefor.

It is to be understood that the foregoing description and the accompanying drawing have been given by way of illustration and example. It is also to be understood that changes in form of the several parts, substitution of equivalent elements, and rearrangement of parts, which will be readily apparent to one skilled in the art, are contemplated as within the scope of the present invention, which is limited only by the claims which follow.

What is claimed is:

1. A tool of the kind described comprising a base member, means for securing a holding handle thereto, a pair of links secured to said base member in opposed relation and depending downwardly therefrom, a pair of V-shaped links pivotally connected to a common pivot supported by the lower ends of said depending links, an arcuate blade secured to the free side of each V-shaped link, a pair of opposed links pivotally connected to each V-shaped link, said last two pairs of links being pivotally connected at the opposite ends to a common pivot supported by and movable longitudinally of said depending links, and an operating member pivotally connected to one pair of said last links intermediate the ends thereof, said operating member being disposed substantially parallel to said base member and including means for attachment of an operating handle thereto, said blades being in spaced opposed positions in one extreme position of movement of said operating member and in closed bucket forming positions in the other extreme position of movement thereof, said operating member being reciprocable to open and close said blades thereby permitting digging or removal operations by said tool within a cylindrical area into which the blades will pass.

2. A tool of the kind described comprising an elongated base, a pole-like holding handle removably secured to said base, a pair of opposed blades pivotally connected to said base for movement between open and closed positions, means for pivoting said blades between open and closed positions including an elongated operating member mounted adjacent and parallel to said base for reciprocating movement relative thereto within the projected zone of the blades when in open position, and a pole-like operating handle removably secured to said operating member and extending in substantially contiguous relation with said holding handle, whereby said holding handle and said operating handle may be grasped together at their free ends.

3. A tool of the kind described comprising an elongated base, a pair of opposed blades adapted to close upon each other in bucket forming relation for grappling purposes, means including links and pivots mounting the blades to the base for movement from and into said bucket forming relation, and an elongated operating member disposed substantially parallel to and in offset reciprocable relation to the base and pivotally connected to one of said links for selectively effecting said movement of the blades.

4. A tool of the kind described comprising an elongated base, a pair of opposed blades adapted to close upon each other in bucket forming relation for grappling purposes, means including links and pivots mounting the blades to the base for movement from and into said bucket forming relation, an elongated operating member disposed substantially parallel to and in offset reciprocable relation to the base and pivotally connected to one of said links for selectively effecting said movement of the blades, and individual extensions removably secured to said base and said operating member, respectively, said extensions being adapted to be manually grasped together at any point along their common extension.

WALTER R. PROETZ.

References Cited in the file of this patent

UNITED STATES PATENTS

| Number | Name | Date |
|--------|------|------|
| 208,749 | McCann | Oct. 8, 1878 |
| 281,193 | Kohler | July 10, 1883 |
| 333,452 | Disston | Dec. 29, 1885 |
| 576,756 | Cole | Feb. 9, 1897 |
| 652,077 | Burson | June 19, 1900 |
| 1,187,316 | Higby | June 13, 1916 |
| 1,888,929 | McDowell | Nov. 22, 1932 |
| 2,028,680 | Mayeda et al. | Jan. 21, 1936 |
| 2,230,498 | Loos et al. | Feb. 4, 1941 |